United States Patent [19]
Braat

[11] Patent Number: 6,038,077
[45] Date of Patent: Mar. 14, 2000

[54] OPTICAL IMAGING SYSTEM

[75] Inventor: Josephus J. M. Braat, Eindhoven, Netherlands

[73] Assignee: U.S. Philips Corporation, New York, N.Y.

[21] Appl. No.: 09/132,862

[22] Filed: Aug. 12, 1998

[30] Foreign Application Priority Data

Aug. 19, 1997 [EP] European Pat. Off. .............. 97202537
Jun. 9, 1998 [EP] European Pat. Off. .............. 98201908

[51] Int. Cl.$^7$ ........................................ G02B 3/00
[52] U.S. Cl. ........................................ 359/642; 359/719
[58] Field of Search ................... 359/618, 619, 359/626, 628, 642, 718, 719

[56] References Cited

U.S. PATENT DOCUMENTS

| | | | |
|---|---|---|---|
| 4,623,496 | 11/1986 | Verhoeven et al. ................. | 264/1.7 |
| 4,668,056 | 5/1987 | Braat et al. ........................ | 350/432 |
| 5,450,244 | 9/1995 | Fantone ............................ | 359/719 |

OTHER PUBLICATIONS

R. Clausius, "Ueber die Concentration von Warme–und Lichtstrahlen und die Grenzen ihrer Wirkung", Annalen der Physik und Chemie 121, No. 1, pp. 1–44, 1864.
H. Helmholtz, "Die theoretische Grenze fur die Leistungsfahigkeit der Mikroskope", Annalen der Physik und Chemie, pp. 557–584, 1874.
E. Abbe, "Beitrage zur Theorie des Mikroskops und der mikroskopischen Wahrnehmung", Archiv fuer mikroskopische Anatomie 9, pp. 413–468, 1873.
J. Herschel Phil. Trans. Roy. Soc. 111, p. 226, 1821.

*Primary Examiner*—Huy Mai
*Attorney, Agent, or Firm*—Lerov Eason

[57] ABSTRACT

Imaging conditions for the aperture rays of an axial pencil, for example Abbe's sine condition, determine how an object volume will be imaged in the image space of an optical lens system. The invention provides an optical lens element having an imaging condition which analytically should lead to the largest possible volume in an image space wherein possible aberrations (spherical aberration and coma) remain below a certain prescribed level.

4 Claims, 2 Drawing Sheets

OPTICAL IMAGING SYSTEM

BACKGROUND OF THE INVENTION

1. Field of the Invention

The invention relates to a method for manufacturing an optical system having an optical axis and imaging a point P to a point P', both on the optical axis. The invention also relates to an optical system for imaging an object point P to an image point P'.

2. Description of the Related Art

The quality of the image formed at P' is generally expressed in terms of optical aberrations. The aberration theory of images generated by an optical system has been gradually developed from the seventeenth century on. Early analyses by e.g. Descartes, Roberval and Huygens concern the spherical aberration which arise when imaging an object point through a single refracting or reflecting surface. From this work we know the perfect or stigmatic imaging properties of conic sections (quadratic surfaces) and the so-called oval surfaces of Descartes (quartic surfaces). As a special case, the stigmatic points generated by a spherical surface are obtained (Huygens aplanatic points). Further research was oriented towards the spherical aberration generated by a single lens and later in the eighteenth century, the comatic aberration of off-axis pencils of rays. As a result, at the beginning of the nineteenth century, the as-designed quality of telescope objectives by Dolland and Fraunhofer was very good (well within the diffraction limit) and the actual optical quality of the instruments was mainly limited by manufacturing imperfections and material inhomogeneities. However, the numerical aperture and the field angle of these objective were rather small.

The need for an aberration theory valid for more complicated optical systems with larger values of numerical aperture and field angle was felt when photography emerged. The so-called third order aberration theory which, in principle covers both larger aperture and field angles was probably first developed by Petzval but his results remained unpublished. A comprehensive third order theory for optical systems with circular symmetry consisting of a arbitrary sequence of optical elements was published by L. von Seidel in 1856. As a rule of thumb, this approximate theory yields reliable results for numerical apertures up to 0.10 or even 0.15 while the field angle may amount to some ten degrees. The Seidel third order theory was of great help for the design of photographic objectives with the specifications of the second half of the past century. For the design of e.g. microscope objectives with a high numerical aperture, i.e. larger than 0.50, and a small field angle, the Seidel theory is not sufficient although it can produce a good design starting point.

In 1863, R. Clausius[1] published a paper in which he shows under what condition an optical system (e.g. a mirror system) is able to concentrate radiant power in an optimum way even when the aperture of the imaging pencils is large. In 1874, H. Helmholtz[2] showed that for correct imaging of a finite size object the so-called sine condition should be respected because otherwise the optical throughput or etendue of the optical system is not preserved from object to image space. But it is the name of E. Abbe[3] which is generally associated with this sine condition because he was the first to establish the link between this condition and the freedom of comatic aberration of the imaging system even at large aperture.

In optical recording the exit plane of a semiconductor laser is imaged onto a record carrier through an objective lens. During operation of a record player, the image should follow tracks on the record carrier. To that end, the position of the image on the record carrier is varied by moving the objective lens in a plane perpendicular to its optical axis. Known objective lenses[4] have been designed to comply with the sine condition in order to obtain the necessary large field. The image must be focused in the plane of the tracks. To maintain the correct focusing when the record carrier shows deflections in the direction of the optical axis, the objective lens is moved along the optical axis. However, at larger numerical apertures it has turned out to be difficult to maintain the quality of the image when following the axial deflections.

SUMMARY OF THE INVENTION

It is an object of the invention to provide an optical lens system which does not have the above disadvantage. Another object is to provide a method for manufacturing such an optical lens system.

In accordance with the invention, the design of the optical lens system, is such that substantially all rays from P to P' satisfy the condition $$n \sin\left(\frac{\alpha}{q}\right) = \beta' n' \sin\left(\frac{\alpha'}{q}\right)$$

where α and α' are the angles of the ray with the optical axis at P and P' respectively, n and n' are the refractive indices at P and P' respectively, β' is the lateral magnification factor between P and P', and q is a constant complying with 1<q<2, and in that the method comprises a step of making the optical system according to the design.

The known objective lenses have been designed to comply with the sine condition, i.e. the above condition with q=1. The loss of quality of such an objective lens when following axial deflections of the record carrier turns out to be caused by the changing axial magnification factor and the fact that the known objective lens does not comply with the so-called Herschel condition[5]. This condition guarantees sharp imaging when the magnification is varied, i.e. when the image point is shifted along the optical axis. The loss of quality could be reduced by redesigning the objective lens such that it complies with the Herschel condition, i.e. the above condition with q=2. However, an objective lens complying with the Herschel condition has too small a field for a satisfactory operation of the record player. In order to obtain a large field and a large axial excursion, the optical system according to the invention is designed to comply not with the sine or Herschel condition, but with the above condition. The actual value of the parameter q in this condition is selected such that the desired balance between field size and axial excursion is obtained.

It is remarked that several optics design programmers can vary the value of the parameter q in order to achieve certain design goals, such as minimization of specific optical aberrations. In such designs most of the rays comply with q=1 and only a small fraction of the rays has a value of q deviating from 1. In contrast, in the design according to the invention most rays have a value of q different from 1 and only a small fraction of the rays may have a value of q equal to 1. The advantageous large field and large axial excursion will only be achieved under these conditions.

A method for manufacturing an optical system according to the invention preferably comprises a first step of designing the optical system according to the above method and a second step of making the optical system according to the design. The optical system may contain a single element or multiple elements. The elements may be refractive, reflective and/or diffractive.

The objects, advantages and features of the invention will be apparent from the following more particular description of preferred embodiments of the invention, as illustrated in the accompanying drawings, in which FIG. 1 is a schematic drawing illustrating the directions of two related rays in object and image space (the unknown trajectory through the optical system has been indicated by the dotted line). The image P' of P is perfect. A second object point Q has been shifted over infinitesimal distances $\delta y$ and by $\delta z$ with respect to P. Its paraxial image is denoted by Q'. The refractive indices of object and image space are denoted by n and n';

Figure 1:
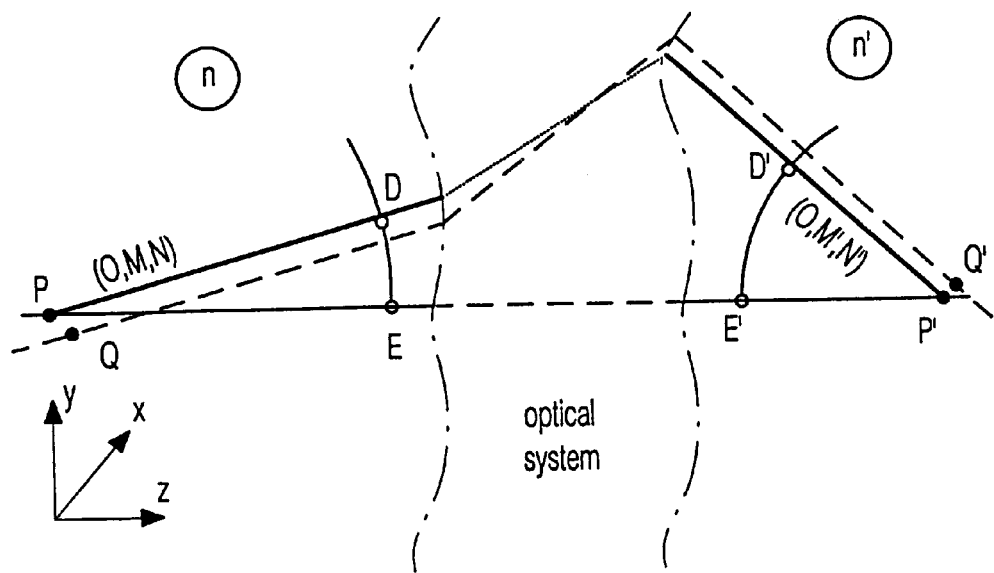

1. DERIVATION OF THE VARIOUS IMAGING CONDITIONS 1.1. The Abbe and the Herschel Condition In FIG. 1 we schematically show an optical system with its entrance and exit pupil located at E and E'. From a pencil of rays leaving the object point P only a certain ray PDD'P' is shown with direction cosines (0,M,M) and (0,M',N') in respectively the object and image space (D and D' are located on the pupil reference spheres). The plane of the drawing is the yz-plane with: x=0. We suppose that the pencil of rays is exactly focused at P' (stigmatic imaging). We now want to know how a pencil of rays leaving a neighbouring object point Q is focused in image space. According to paraxial optics, the position of an image point Q' derived from the object point Q, which has been subjected to infinitesimal shifts $\delta y$ and $\delta z$ with respect to P, is found by applying the correct (paraxial) magnification factors. The lateral magnification factor is denoted by $\beta' = \delta y'/\delta y$ and the axial magnification factor is $\delta' = \delta z'/\delta z$. It can be shown that the relationship between the lateral and axial magnification is given by[6]

$$\delta' = \frac{n'}{n} \beta^2, \quad (1)$$

where n and n' are the refractive indices in object and image space.

It now has to be seen under what condition the image quality of Q' can be equal to the (perfect) quality of P'. To this goal, we take, from the pencil of rays through Q, a particular ray (dashed in the Figure) which is parallel to the ray through P shown in the drawing. Physically spoken, we consider this ray to represent a small part of a plane wave with the direction cosines (0,M,N). If the reference point for measuring pathlength is shifted form P towards Q, the change $\Delta W$ in path of the propagating wave along the ray from P to P' is given by the scalar product of the ray vector $\vec{s} = (0,M,N)$ and the displacement vector $\delta \vec{r} = (0,\delta y,\delta z)$ multiplied with the refractive index of the object space:

$$\Delta W = -n \delta \vec{r} \cdot \vec{s}. \quad (2)$$

The minus sign is needed here, because a shift in the positive z-direction leads to a shorter optical path for a ray along the optical axis.

In the image space, given the image displacement vector $\delta \vec{r}'$ and the ray vector $\vec{s}'$, we observe a path difference $\Delta W$ according to $$\Delta W' = n' \delta \vec{r}' \cdot \vec{s}'. \quad (3)$$

Equal imaging quality in Q and P (isoplanatism) is obtained when the residual $\delta W$ of the path differences in object and image space is zero for arbitrary values of the ray vectors of all rays belonging to the object and image space pencils ($\delta W = \Delta W + \Delta W' = 0$).

We discern two particular cases:

$\delta \vec{r} = (0, \delta y, 0)$

The isoplanatic condition now becomes:

$$\delta W_C = n' \delta y' M' - n \delta y \, M = 0 \quad (4)$$

Using the paraxial magnification which exists between $\delta y'$ and $\delta y$ we obtain for the residual aberration $$\delta W_C = \left[ M' - \frac{nM}{n' \beta'} \right] (n' \delta y'). \quad (5)$$

This condition, which guarantees the absence of aberration if an infinitesimal lateral excursion off-axis is applied, is generally known as Abbe's sine condition. We have used the index C for the aberration because this aberration is called coma.

$\delta \vec{r} = (0,0,\delta z)$

The corresponding isoplanatic condition becomes:

$$\delta W_S = n' \delta z' N' - n \delta z \, N = 0 \quad (6)$$

Using the paraxial axial magnification $\delta'$ existing between $\delta z$ and $\delta z'$ we obtain for the residual aberration:

$$\delta W_S = \left\{ N' - \frac{n^2 N}{n'^2 \beta'^2} \right\} (n' \delta z'). \quad (7)$$

This condition, which guarantees an extended axial range over which the object point can be shifted, is known as Herschel's condition. The subscript S has been used because the aberration which could appear is circularly symmetric spherical aberration. In general, the constant pathlength difference ($n' \delta z' - n \delta z$) encountered for the axial ray (N=N'=1) is subtracted from the expression above and we obtain:

$$\delta W_S = \left\{ (N' - 1) - \frac{n^2 (N - 1)}{n'^2 \beta'^2} \right\} (n' \delta z') = 0. \quad (8)$$

Abbe's sine condition is a prerequisite for an optical system which needs to image an extended flat object, e.g for a photographic camera objective, a reduction objective but also for a microscope objective or an astronomical telescope. Herschel's condition is required when a system needs to operate at different magnifications, e.g. a narrow field telescope for both remote and close observation. Unfortunately, both conditions seriously conflict when the numerical aperture becomes high. A particular case arises when $\beta' = \pm n/n'$, a case which reduces to unit magnification when n=n'; here, both conditions can be satisfied simultaneously. In most applications, it is the sine condition which will prevail because otherwise the useful lateral or angular image field would become unacceptably small.

1.2. Residual Aberration

In this subsection we calculate the residual aberration when either the Abbe or the Herschel condition is satisfied by the optical system. Either in the lateral (Abbe) or in the axial (Herschel) direction, the first derivative of the aberration with respect to the shift of the image point is zero but in the orthogonal direction, the residual aberration will generally increase rapidly.

1.2.1. Residual spherical aberration when the Abbe condition is satisfied

When the Abbe sine condition is complied with, the relationship between the M-direction cosines is $$nM/n'\beta' = M'. \quad (9)$$

Using the relation $$N = \sqrt{1 - M^2} = \sqrt{1 - \left(\frac{n'}{n}\beta'M'\right)^2} \quad (10)$$

and expanding the square root up to the fourth order in M' one obtains for the spherical aberration (Eq. 7) up to the fourth order:

$$\delta W_S = \frac{1}{8}\left(\frac{n'^2 \beta'^2}{n^2} - 1\right) M'^4 (n'\delta z'). \quad (11)$$

Applied to a microscope objective with a numerical aperture of 0.65 (NA=$M_m$, =maximum value of M') and a magnification $\beta'$=0 (object at infinity), we obtain a permitted excursion $\delta z'$ equal to 24.6 μm (n=n'=1 and λ=0.55 μm). For the permitted spherical aberration $W_S^m$ we take the value of 1λ peak-to-valley, the tolerance limit for an optical system to be just diffraction-limited[7]. When the numerical aperture is increased to 0.90, the z'-excursion reduces to 6.7 μm.

1.2.2. Residual coma when the Herschel condition is satisfied

If the Herschel condition is complied with, Eq. 6 holds, and, after the elimination of M, N and N', the expression for the comatic aberration (Eq. 5) yields up to the fifth order $$\delta W_C = -\frac{1}{8}\left(1 - \frac{n'^2 \beta'^2}{n^2}\right)\left\{M'^3 + \frac{M'^5}{2}\right\}(n'\delta y'). \quad (12)$$

Using the same numerical values as above for a microscope objective and applying the just diffraction-limited aberration tolerance $W_C^m$ for coma of the third order (0.63λ), we obtain a maximum lateral excursion $\delta y'_m$ of 10.0 μm at an aperture of 0.65. When the aperture is increased to 0.90, the half field size $\delta y'_m$ reduces to 3.8 μm.

A comparison of both imaging conditions shows that, especially at high aperture, the sine condition should be preferably imposed as the design criterion of the optical system. If the opposite choice (Herschel condition) is made, the lateral extent of the image field is unacceptably small. Note that the value of $\beta'$=0 is the worst regarding the incompatibility of the Abbe and Herschel condition (we suppose $|\beta'| \leq n/n'$). The residual aberration gradually diminishes to zero when β moves towards the optimum value ±n/n'.

2. IMAGING CONDITION FOR MAXIMUM IMAGE VOLUME

In this section we calculate the imaging condition which guarantees the largest possible volume in image space. The possible aberrations (spherical aberration and coma) should remain below their just diffraction limited values indicated above. For this maximum image volume to be obtained, we suppose that neither the Herschel nor the Abbe condition is fully satisfied.

2.1. The Axial and Lateral Extent of the Imaging Volume

As a starting point, we tolerate an offense against the sine condition of the lowest (third) order according to:

$$\delta W_C = \left(M' - \frac{nM}{n'\beta'}\right)(n'\delta y') = -\epsilon M'^3 (n'\delta y') \leq W_C^m, \quad (13)$$

where $\epsilon$ is a small factor to be optimized further on. With this comatic aberration, the maximum image field radius becomes $$\delta y'_m = \frac{W_C^m}{|\epsilon| n' M_m'^3} \quad (14)$$

with $M'_m$ the maximum aperture of the optical system.

The corresponding value of the spherical aberration is given by Eq. (7); the elimination of M, N and N' is done with the aid of the expressions $$M' - \frac{nM}{n'\beta'} = -\epsilon M'^3$$

$$N = \sqrt{1 - M^2} \approx 1 - \frac{M^2}{2} - \frac{M^4}{8} \quad (15)$$

$$N' = \sqrt{1 - M'^2} \approx 1 - \frac{M'^2}{2} - \frac{M'^4}{8}$$

After some algebra, the resulting spherical aberration turns out to be given by:

$$\delta W_S = \left[\epsilon + \frac{1}{8}\left(\frac{n'^2 \beta'^2}{n^2} - 1\right)\right] M'^4 (n'\delta z'). \quad (16)$$

The maximum axial excursion $\delta z'_m$ now becomes $$\delta z'_m = \frac{W_S^m}{n' M_m'^4 \left[\epsilon + \frac{1}{8}\left(\frac{n'^2 \beta'^2}{n^2} - 1\right)\right]}. \quad (17)$$

For the still diffraction-limited image volume with the shape of an ellipsoid we find the expression $$\delta V = \left|\frac{4\pi}{3}(\delta y'_m)^2 \delta z'_m\right| \quad (18)$$

$$= \frac{4\pi}{3}\left(\frac{W_C^m}{\epsilon n' M_m'^3}\right) \left| \frac{W_S^m}{n' M_m'^4 \left[\epsilon + \frac{1}{8}\left(\frac{n'^2 \beta'^2}{n^2} - 1\right)\right]} \right|$$

The substitution of the values for $W_C^m$ (0.63λ) and $W_S^m$ (1λ) yields the final expression $$\delta V = 1.67 \left\{ \frac{\lambda^3}{n'^3 \, M_m'^{10}} \right\} \cdot \left\{ \frac{1}{\epsilon^2 \left[ \epsilon + \frac{1}{8} \left( \frac{n'^2 \beta'^2}{n^2} - 1 \right) \right]} \right\} \quad (19)$$

2.2. The Maximum Possible Image Volume

Figure 2:
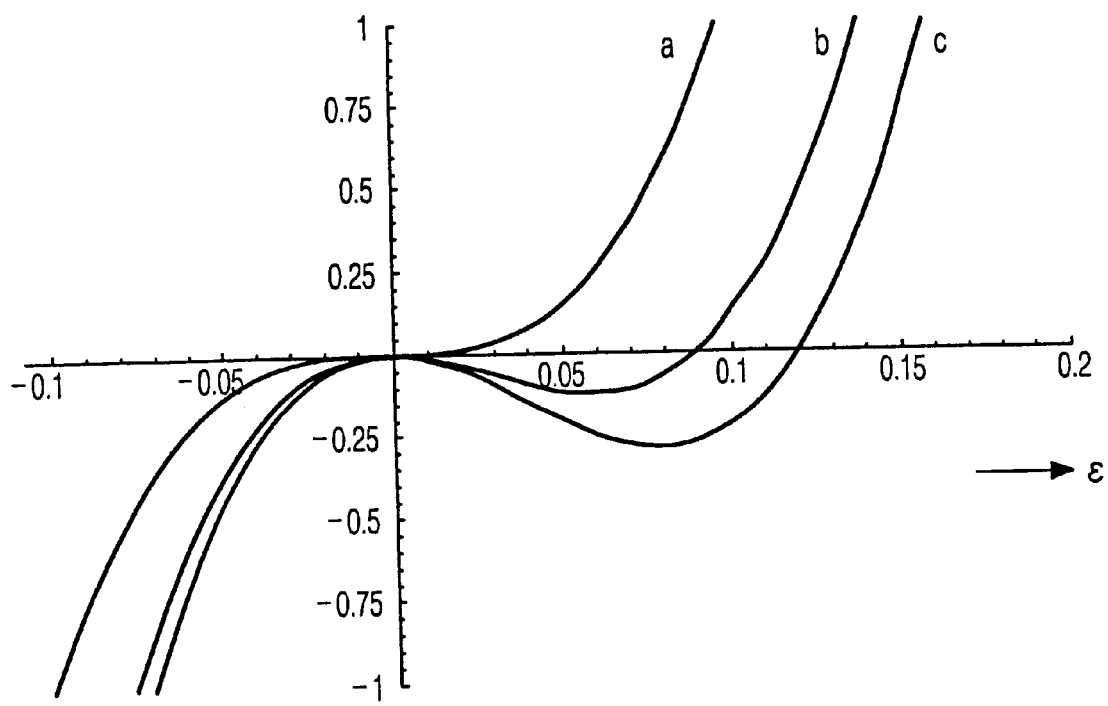
FIG. 2 shows the behaviour of the function $10^3 f(\epsilon)$ to be minimized for maximum image volume. The lateral magnification factor $\beta'$ is the parameter and equals 1 (curve a), 0.5 (curve b) and 0 (curve c)

To maximize the expression for the just diffraction-limited image volume $\delta V$, the denominator of the second term in Eq. 19 should be minimized. In FIG. 2 we have depicted the $\epsilon$-dependent function $$f(\epsilon) = \left\{ \epsilon^2 \left[ \epsilon + \frac{1}{8}(\beta^2 - 1) \right] \right\} \quad (20)$$

in the denominator of Eq. 19 for several values of the lateral magnification $\beta'$ (n=n'=1).

The values $\epsilon=0$ and $\epsilon=(1-\beta'^2)/8$ correspond to respectively the Abbe and Herschel condition. However these conditions do not necessarily guarantee a maximum image volume for a real optical system when the linear approximation for the aberration change is not sufficient.

An interesting point is the extremum found at the value $$\epsilon_{extr} = \frac{1}{12} \left( 1 - \frac{n'^2 \beta'^2}{n^2} \right). \quad (21)$$

This extremum is gradually shifting to the origin when the magnification approaches the value $|n/n'|$, corresponding to the specific case where both the Abbe and Herschel condition can be satisfied simultaneously.

The numerical values associated with the extremum considered above are:

$\beta'=0$, $\lambda=0.55$ $\mu$m, n=n'=1, NA=$M_m'$=0.65:
  $\delta y'=15.1$ $\mu$m $\delta z'=73,9$ $\mu$m
idem, NA=0.90
  $\delta y'=5.7$ $\mu$m $\delta z'=20.1$ $\mu$m For the actual volume available at the value $\epsilon_{extr}$ we obtain (n=n'=1)

$$\delta V_{extr} = \frac{5745 \, \lambda^3}{(1 - \beta'^2)^3 \, M_m'^{10}} = \frac{4\pi}{3} \left\{ \frac{11.1\lambda}{(1 - \beta'^2)} \right\}^3 \frac{1}{M_m'^{10}}. \quad (22)$$

2.3 Balance Between Abbe and Herschel

The image volume has the shape of an ellipsoid of revolution having a radius of $\delta y_m'$ in a plane perpendicular to the axis of revolution and a radius of $\delta z_m'$ along the axis of revolution. The ratio between these two radii expresses the balance between the size of the field and the axial excursion and is give by $$\left| \frac{\delta z_m'}{\delta y_m'} \right| = \left| \frac{W_s^m}{W_c^m M_m'} \cdot \frac{\epsilon}{\epsilon + \frac{1}{8}\left( \frac{n'^2 \beta'^2}{n^2} - 1 \right)} \right| \quad (23)$$

For just diffraction-limited operation, the values of $W_C^m$ and $W_S^m$ may be taken again as $0.63\lambda$ and $1\lambda$ respectively. The value of $\delta y_m'$ and $\delta z_m'$ is in general prescribed by the requirements imposed on the optical system. Eq. 23 allows then to derive a value for $\epsilon$, indicating the balance struck between the Abbe and Herschel condition. From the value of $\epsilon$ a value of the parameter q can be derived. Insertion of the value of q in the design condition allows the design of an optical system having the desired image volume. The optical system can subsequently be manufactured using known techniques[4].

3. EMBODIMENT

Figure 3:
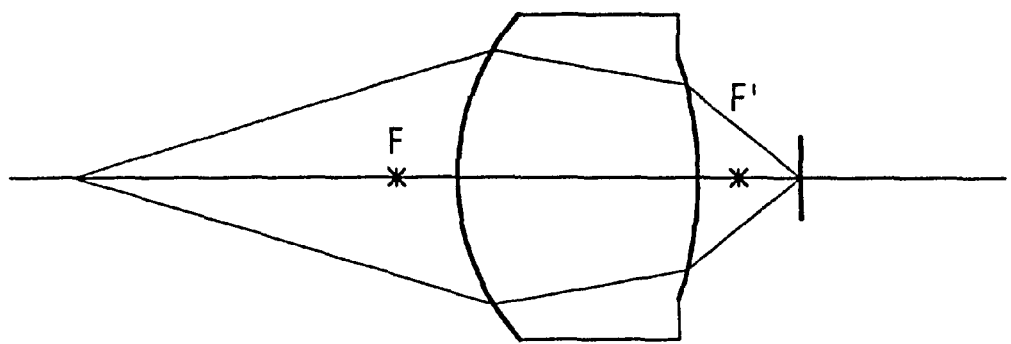
FIG. 3 shows a lens designed according to the invention.

FIG. 3 shows an embodiment of an optical system designed according to the invention. The system comprises one bi-aspheric lens having a numerical aperture of 0.7, a magnification of −0.5 and a focal length of 2.2 mm. F and F' are the focal points of the lens. The design wavelength is 0.55 $\mu$m. The refractive index of the lens body is 2.2. In the design the value of q is set to 1.6. The polynomial expansion of the aspheric surface on the left hand side of the lens in FIG. 3 has the coefficients 0.12469239, −0.001400868, 0.0000376154, −0.0000020626 and 0.000000077 for the even powers $r^2$ to $r^{10}$ of the radius r. The polynomial expansion of the aspheric surface on the right hand side in FIG. 3 has the coefficients −0.08451900, 0.01191275, −0.002616027, 0.000606815, −0.000125477, 0.000019868, −0.000002144 and 0.000000137 for the even powers $r^2$ to $r^{16}$. The lateral extent of the imaging volume $\delta y_m'$ is 11 $\mu$m and the axial extent $\delta z_m'$ is 160 $\mu$m. The lens can be made by computer-controlled grinding of a glass body, by hot-glass moulding or by the so-called replication method. In the latter method an aspheric cover layer of resin is moulded onto a glass body having spherical surfaces, as disclosed in inter alia U.S. Pat. No. 4,623,496.

Figure 4:
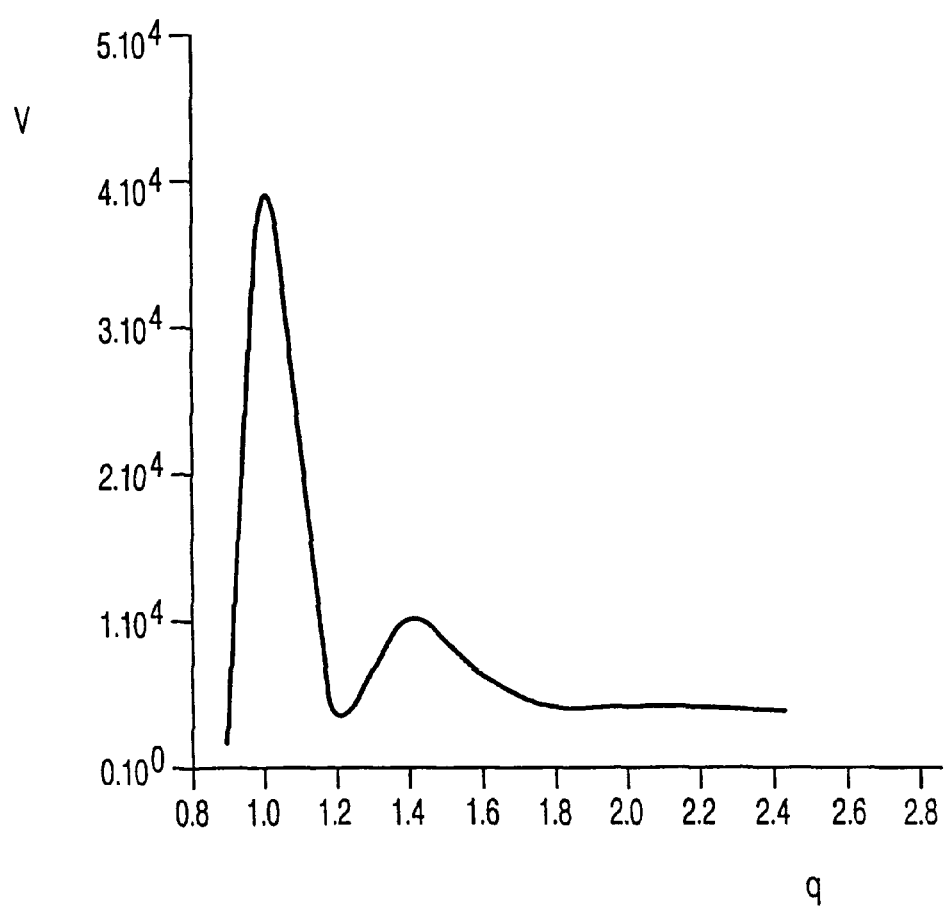
FIG. 4 shows a graph of the imaging volume of the lens of FIG. 3 as a function of a design parameter q.

FIG. 4 shows a graph of the imaging volume V of the lens presented in FIG. 3. The volume is defined as the product $(\delta y_m')^2 \cdot \delta z_m'$. FIG. 4 shows the volume, given in units of $\mu m^3$, as a function of the parameter q.

4. CONCLUSION

The imaging condition according to the invention leads to a maximum diffraction-limited image volume. The design of an optical system towards maximum imaging volume is of practical importance in, among others, 3D scanning confocal microscopy and in optical disc light paths operating at finite variable magnification.

5. REFERENCES

1. R. Clausius, "Ueber die Concentration von Wärme- und Lichtstrahlen und die Grenzen ihrer Wirkung, " Annalen der Physik und Chemie 121, No. 1, pp. 1–44, 1864.
2. H. Helmholtz, "Die theoretische Grenze für die Leistungsfähigkeit der Mikroskope, " Annalen der Physik und Chemie, pp. 557–584, 1874.
3. E. Abbe, "Beiträge zur Theorie des Mikroskops und der mikroskopischen Wahrnehmung, " Archiv fuer mikroskopische Anatomie 9, pp. 413–468, 1873.
4. U.S. Pat. No. 4 668 056
5. J. Herschel Phil. Trans. Soc. 111, p. 226, 1821.
6. W. Welford, Aberrations of optical systems, Adam Hilger, Bristol, 1986.
7. M. Born and E. Wolf, Principles of Optics, Pergamon Press, New York, 1980.

I claim:

1. An optical lens system having an optical axis and which images an object point P to an image point P', both on the optical axis; and wherein substantially all rays from P to P' satisfy the condition $$n \sin\left(\frac{\alpha}{q}\right) = \beta' n' \sin\left(\frac{\alpha'}{q}\right)$$

where $\alpha$ and $\alpha'$ are the angles of any one of the rays with the optical axis at P and P' respectively, n and n' are the refractive indices at P and P' respectively, $\beta'$ is the lateral magnification factor between P and P', and q is a constant complying with $1 < q < 2$.

2. An optical lens system according to claim 1, wherein the constant q complies with $1.1 < q < 1.9$.

3. An optical lens system for imaging an object point P to an image point P', wherein said optical lens system has a maximum image field radius $\delta y_m'$ and a maximum axial excursion $\delta z_m'$ complying with $$\left|\frac{\delta z_m'}{\delta y_m'}\right| = \left|\frac{W_s^m}{W_C^m M_m'} \cdot \frac{\epsilon}{\epsilon + \frac{1}{8}\left(\frac{n'^2 \beta'^2}{n^2} - 1\right)}\right|$$

where $W_s^m$ is the peak-valley aberration tolerance for spherical aberration, $W_C^m$ is the peak-valley aberration tolerance for coma, $M_m'$ is the image-side numerical aperture, n and n' are the refractive indices at P and P' respectively, $\beta'$ is the lateral magnification factor, and $\epsilon$ is a constant complying with $$0 < \epsilon < \frac{1}{8}\left(\frac{n'^2 \beta'^2}{n^2} - 1\right).$$

4. Optical system according to claim 3, wherein the constant $\epsilon$ complies with $$0.05 < \frac{8\epsilon}{\frac{n'^2 \beta'^2}{n^2} - 1} < 0.95.$$

* * * * *